Figure 1:
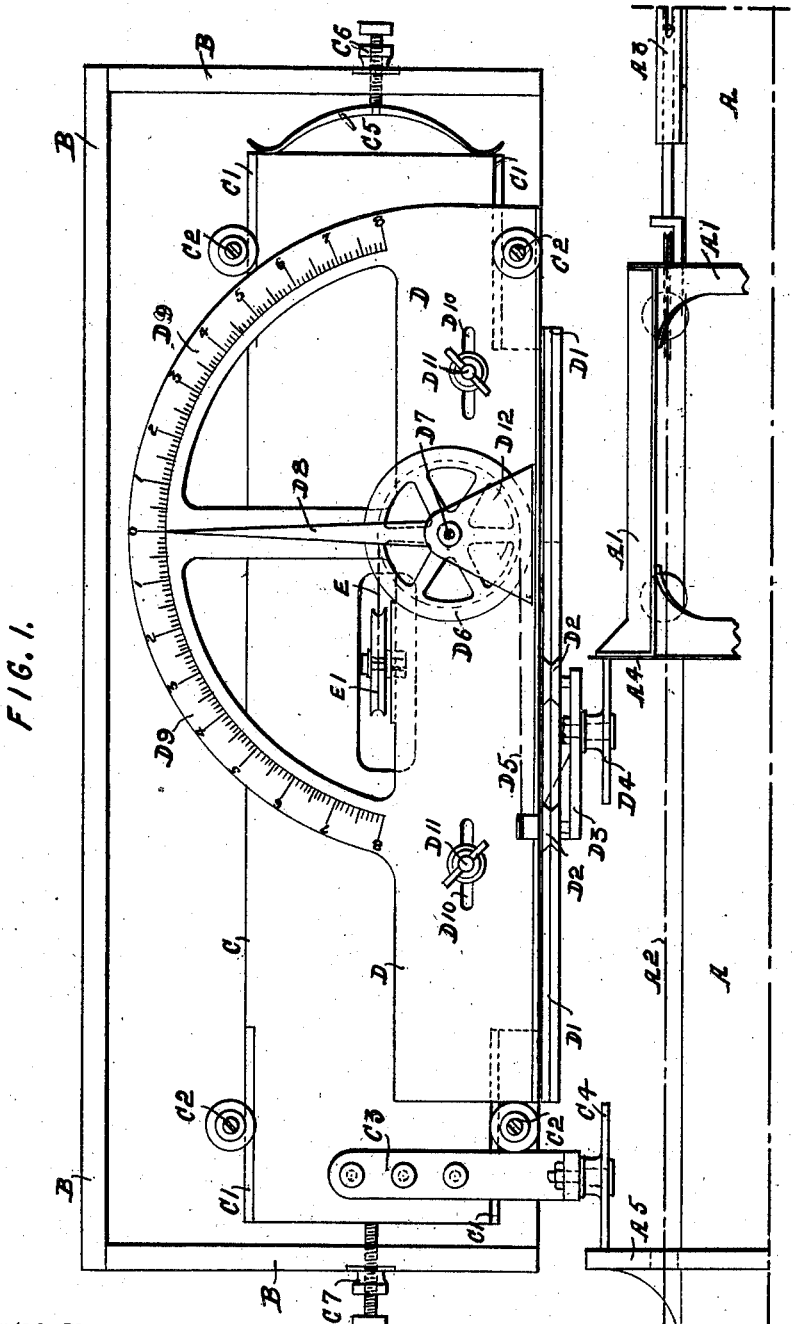

F. T. EDGECOMBE.
TORSIOMETER.
APPLICATION FILED DEC. 13, 1909.

963,699.

Patented July 5, 1910.
3 SHEETS—SHEET 1.

WITNESSES

INVENTOR
Frederick Thomas Edgecombe
BY
ATTORNEYS

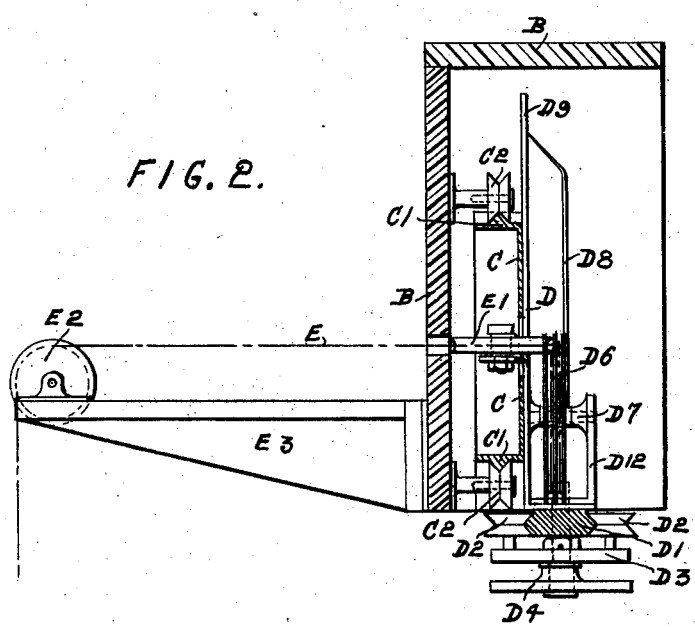

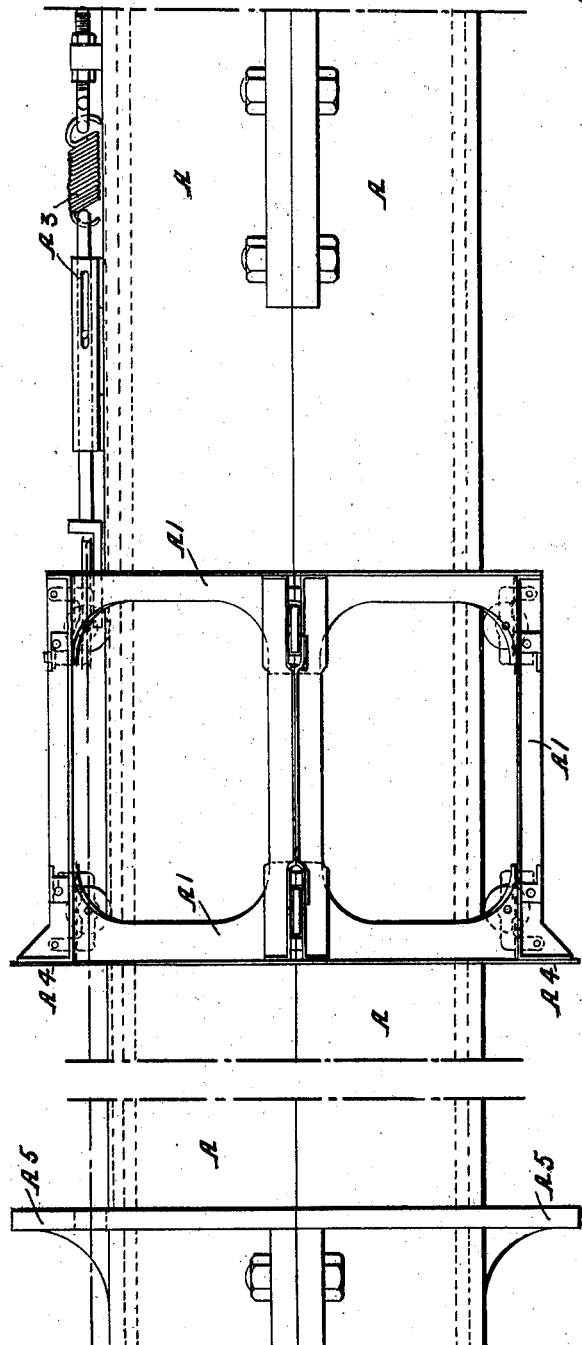

UNITED STATES PATENT OFFICE.

FREDERICK THOMAS EDGECOMBE, OF DUMBARTON, SCOTLAND.

TORSIOMETER.

963,699.   Specification of Letters Patent.   Patented July 5, 1910.

Application filed December 13, 1909. Serial No. 532,886.

*To all whom it may concern:*

Be it known that I, FREDERICK THOMAS EDGECOMBE, a subject of the King of Great Britain and Ireland, and a resident of Dumbarton, in the county of Dumbarton, Scotland, have invented certain new and useful Improvements in Torsiometers, and of which the following is the specification.

This invention relates to mechanical torsiometers of the kind in which the circumferential movement due to torsion in a shaft is mechanically multiplied and transformed to movement longitudinal to the shaft. Such an instrument may be applied directly to the shaft or in connection with a counter-shaft parallel therewith.

The present invention has for its object to apply improved simple and effective indicating or recording or conjoint indicating and recording mechanism for use in connection with this form of torsiometer, and in which readings or records are unaffected by relative movement or vibration between the shaft in which torsion is being measured and the structure (ship) in which that shaft is.

In the type of torsiometer referred to there is a sleeve through which torsion does not pass, and upon this sleeve a rider traversing it and operating the indicating or recording mechanism by means of a flange. There is also upon the sleeve a flange acting as a base for adjustment of the instrument. According to the invention there is provided adjacently to the sleeve, and supported in any convenient manner, a casing. Within this casing, and adapted to slide parallel with the sleeve, is a base, bearing adjacently to one end a roller engaging the base flange of the sleeve and on an axis substantially at right angles to the axis of the sleeve. Means, such as a spring, applied between the opposite end of the base and the casing, are provided to keep the roller constantly in contact with the side of the base flange, but at the same time admit of relative longitudinal movement of the base within the casing. Operating in longitudinal guides in the base is a carriage bearing a second roller engaging the side of the rider flange. The carriage is connected by suitable gearing—very conveniently a cord—with a pointer traversing a scale (in the case of an indicating instrument) while a weight or spring is applied to keep the roller upon the carriage always in contact with the rider flange and to eliminate backlash in the multiplying gear—that is to say, a cord fixed at one end to the carriage may pass around and be fixed to a drum upon the pointer spindle and another similar cord may pass from that drum over guide pulleys to a weight or spring tensioning device. Means are provided for adjusting pointer and scale bodily, relatively to the base upon which they are carried. Various other arrangements of the recording instruments will readily suggest themselves and I do not limit my invention to the particular type shown.

Means may be provided for locking the base and carriage in such position that the respective rollers do not engage their respective flanges—that is to say, for throwing the instrument out of gear and so avoiding continuous wear of its parts.

In order that the invention and the manner of performing the same may be properly understood, there is hereunto appended a sheet of explanatory drawings showing in Figure 1 in elevation an example of the improved instrument and so much of a torsiometer of the type referred to as to enable its application thereto to be adequately understood, and in Fig. 2 a sectional end elevation of the instrument. Fig. 3 is an elevation of a larger part of the lower portion of the torsion meter shown in Fig. 1.

In the type of torsiometer referred to there is, as shown in the drawings, a sleeve A through which torsion does not pass, and upon the sleeve a rider $A^1$ moved to and fro by a cord $A^2$ from the measuring mechanism (not shown) co-acting with a spring tension device $A^3$. The rider bears a flange $A^4$ operating the indicating or recording instrument, and the sleeve A bears a flange $A^5$ acting as a base for the adjustment of the instrument all as hereinafter explained.

The improved indicating instrument comprises a boxlike casing B supported in any convenient manner adjacently to the sleeve A. Within this casing is a base C of rectangular form having section parts $C^1$ formed upon its edges which are engaged by rollers $C^2$ carried in the casing in such position that the base may move on the rollers $C^2$ parallel with the sleeve A. At one end the base C has upon it a bracket $C^3$ upon which is mounted on an axis at right angles to the axis of the sleeve A an antifriction roller $C^4$ engaging the base flange $A^5$. A spring $C^5$ is provided between the opposite end of the base C and the casing B to keep the roller $C^4$ normally constantly in contact with the flange $A^5$, but at the same time permit of longitudinal movement of the base within the casing, a set screw $C^6$ and lock-nut are provided for adjustment of the spring, while at the opposite end of the base there is provided a similar set screw $C^7$ and lock-nut by means of which the base may be moved to take the roller $C^4$ out of and into gear with the flange $A^5$.

Upon the base C is mounted a plate D carrying a double guide $D^1$ with which there engage rollers $D^2$ mounted on a carriage $D^3$ bearing an antifriction roller $D^4$ engaging the side of the rider flange $A^4$. To the carriage is anchored a cord $D^5$ passing around and secured to a pulley $D^6$ mounted upon a spindle $D^7$ and which also bears a pointer $D^8$ indicating on a scale $D^9$ formed on the plate D mounted on the base C and adjustable longitudinally thereon through slots $E^{10}$ through which and into the base pass wing screws $D^{11}$. The spindle $D^7$ is pivoted between the plate D and a bracket $D^{12}$ thereon. The pulley $D^6$ has in its periphery two grooves, the one for the cord $D^5$, the other for a similarly attached cord E which passes from it around a guide pulley $E^1$ mounted on the plate D and thence rearwardly out through the casing B and over a pulley $E^2$ on a rearwardly extending bracket $E^3$ thereon and has attached to its end tensioning means of any suitable character, not shown. This tension device acts to keep the carriage roller $D^4$ always in contact with the rider flange $A^4$, and to eliminate backlash in the multiplying gear (not shown).

What I claim is:—

1. In a torsiometer of the type referred to having a sleeve with a base flange and on the sleeve a rider with a flange; a casing, a base within the casing movable lengthwise of the sleeve, a tension device controlling its movements, a part on the base engaging the base flange, a dialed plate adjustable on the base, a pointer traversing the dial, a guide on the plate, a carriage traversing the guide and engaging the rider flange and operative connection between the pointer and the carriage.

2. In a torsiometer of the type referred to having a sleeve with a base flange and on the sleeve a rider with a flange; a casing, a base within the casing movable lengthwise of the sleeve, an adjustable spring between base and casing, a part on the base engaging the base flange, a dialed plate adjustable on the base, a pointer traversing the dial, a guide on the plate, a carriage traversing the guide and engaging the rider flange and operative connection between the pointer and the carriage.

3. In a torsiometer of the type referred to having a sleeve with a base flange and on the sleeve a rider with a flange; a casing, a base within the casing movable lengthwise of the sleeve, a tension device controlling its movements, an antifriction roller on the base engaging the base flange, a dialed plate adjustable on the base, a pointer traversing the dial, a guide on the plate, a carriage traversing the guide and engaging the rider flange and operative connection between the pointer and the carriage.

4. In a torsiometer of the type referred to having a sleeve with a base flange and on the sleeve a rider with a flange, a casing, a base within the casing movable lengthwise of the sleeve, an adjustable spring between base and casing, an antifriction roller on the base engaging the base flange, a dialed plate adjustable on the base, a pointer traversing the dial, a guide on the plate, a carriage traversing the guide and engaging the rider flange and operative connection between the pointer and the carriage.

5. In a torsiometer of the type referred to having a sleeve with a base flange and on the sleeve a rider with a flange; a casing, a base within the casing movable lengthwise of the sleeve, a tension device controlling its movements, a part on the base engaging the base flange, a dialed plate adjustable on the base, a spindle supported on the plate, a pointer on the spindle traversing the dial and a pulley, a guide on the plate, a carriage traversing the guide and engaging the rider flange, a cord anchored to the carriage and passing around and secured to the pulley, a second cord similarly and reversely secured to the pulley, a guide pulley around which the second cord passes and a tension device operatively connected to the end of the second cord.

6. In a torsiometer of the type referred to having a sleeve with a base flange and on the sleeve a rider with a flange; a casing, a base within the casing movable lengthwise of the sleeve, a tension device controlling its movements, a part on the base engaging the base flange, means for moving the base out of contact with the base flange, a dialed plate adjustable on the base, a pointer traversing the dial, a guide on the plate, a carriage traversing the guide and engaging the rider flange and operative connection between the pointer and the carriage.

7. In a torsiometer of the type referred to having a sleeve with a base flange and on the sleeve a rider with a flange; a casing, a base within the casing movable lengthwise of the sleeve, a tension device controlling its movements, a part on the base engaging the base flange, means for moving the base out of contact with the base flange, a dialed plate adjustable on the base, a spindle supported on the plate, a pointer on the spindle, traversing the dial and a pulley, a guide on the plate, a carriage traversing the guide and engaging the rider flange, a cord anchored to the carriage and passing around and secured to the pulley, a second cord similarly and reversely secured to the pulley, a guide pulley around which the second cord passes and a tension device operatively connected to the end of the second cord.

In testimony whereof I have signed my name to this specification, in the presence of two subscribing witnesses.

FREDERICK THOMAS EDGECOMBE.

Witnesses:
    DAVID FERGUSON,
    WILFRED HUNT.